US006788819B1

United States Patent
Swann et al.

(10) Patent No.: US 6,788,819 B1
(45) Date of Patent: Sep. 7, 2004

(54) IMAGE PROCESSING

(75) Inventors: Robert Edward Meredith Swann, Cambridge (GB); Robert Wei Liang Tan, Herts (GB); Robert William Young, Cambs (GB)

(73) Assignee: Consignia PLC, London (GB)

( * ) Notice: Subject to any disclaimer, the term of this patent is extended or adjusted under 35 U.S.C. 154(b) by 0 days.

(21) Appl. No.: 09/724,286

(22) Filed: Nov. 28, 2000

(30) Foreign Application Priority Data

Jun. 30, 2000 (GB) .............................................. 0016216

(51) Int. Cl.⁷ ................................................ G06K 9/62
(52) U.S. Cl. ................................................... 382/224
(58) Field of Search ................................ 382/101, 112, 382/149, 159, 165, 170, 175, 176, 180, 182, 183, 186, 190, 195, 219, 224, 225, 272, 307; 209/3.2, 511, 524, 528, 534, 536, 576, 580, 581, 583, 584

(56) References Cited

U.S. PATENT DOCUMENTS

| | | | | |
|---|---|---|---|---|
| 4,514,816 A | * | 4/1985 | Ollus et al. .................. | 700/223 |
| 4,577,235 A | * | 3/1986 | Kannapell et al. .......... | 358/462 |
| 5,072,291 A | | 12/1991 | Sekizawa ...................... | 358/535 |
| 5,200,831 A | | 4/1993 | Tai ............................. | 358/3.14 |
| 5,642,442 A | * | 6/1997 | Morton et al. ............... | 382/287 |
| 5,978,519 A | * | 11/1999 | Bollman et al. ............. | 382/282 |
| 6,118,552 A | * | 9/2000 | Suzuki et al. ................ | 382/166 |
| 6,163,624 A | | 12/2000 | Kobayashi ................... | 382/194 |
| 6,529,634 B1 | * | 3/2003 | Thyagarajan et al. ....... | 382/239 |
| 2002/0044691 A1 | * | 4/2002 | Matsugu ...................... | 382/218 |

FOREIGN PATENT DOCUMENTS

| | | | | |
|---|---|---|---|---|
| EP | 0 195 925 | | 10/1986 | ............. H04N/1/40 |
| GB | 2 246 230 A | | 1/1992 | ............. G06K/9/52 |
| WO | WO 97/09133 | | 8/1997 | ............. B07C/3/14 |

OTHER PUBLICATIONS

Search Report for GB 0016216.4, dated Jan. 19, 2004.
International Search Report dated Nov. 11, 2001 in PCT International Appl. No. PCT/GB01/02915 (3 pages).
English translation of Description and Claims of JP 11–513023T2, published Oct. 19, 1999 (5 pages).

* cited by examiner

Primary Examiner—Andrew W. Johns
Assistant Examiner—Shervin Nakhjavan
(74) Attorney, Agent, or Firm—Flynn, Thiel, Boutell & Tanis, P.C.

(57) ABSTRACT

An apparatus for processing images comprise means (2) to scan in an image. The image data is stored and a variance calculator (6) calculates a variance for the scanned image. An image categoriser (16) determines what further processing of the image is appropriate in dependence on the variance.

18 Claims, 4 Drawing Sheets

Flat: 1000, Variance (Activity)=162

Flat: 53, Variance (Activity) = 1552

IMAGE PROCESSING

FIELD OF THE INVENTION

This invention relates to a method and apparatus for automated processing of images. It is particularly useful with images of documents for identifying the types of document shown in the image, such as may be used in an automated mail processing system.

BACKGROUND OF THE INVENTION

The complexity of document images is highly variable. This is particularly apparent in mail processing systems where envelopes can have many forms. The simplest type would be a plain white envelope with only an address indicated on it. More complex envelopes may have other material printed on the envelope such as a return address. There are also, e.g., different coloured envelopes, envelopes with windows which enable the address to be seen, plastic envelopes with material printed on them and which also have partial transparency thereby allowing some of the documents within to be seen.

It has been appreciated that it is often most effective to apply different image processing methods to images of different degrees of complexity when performing subsequent analysis. For example, when locating and attempting to read an address on an envelope, different processing methods will be required for the different types of envelope. A plain white envelope would be most simple as the address can be located very easily and then optical character recognition applied to it. A more complex envelope such as a plastic and partially transparent envelope will require additional processing to identify the address prior to optical character recognition.

Previous methods for automated mail processing have used the same type of image processing for all types of envelopes. We have appreciated that this is computationally inefficient as some documents are subjected to processing which is not appropriate to them because of the simplicity of their images.

SUMMARY OF THE INVENTION

A preferred embodiment of the present invention therefore seeks to provide a method and apparatus for identifying images of different types of document so that subsequent processing may be performed on each image in dependence on its document type. By doing this, it is possible to ensure that the most appropriate subsequent analysis process is applied to each document.

It is important that this analysis of document type is computationally efficient since the intention is to reduce the overall computational overhead of processing.

BRIEF DESCRIPTION OF THE DRAWINGS

A preferred embodiment of the invention will now be described in detail by way of example with reference to the accompanying drawings in which.

DETAILED DESCRIPTION

Figure 1:
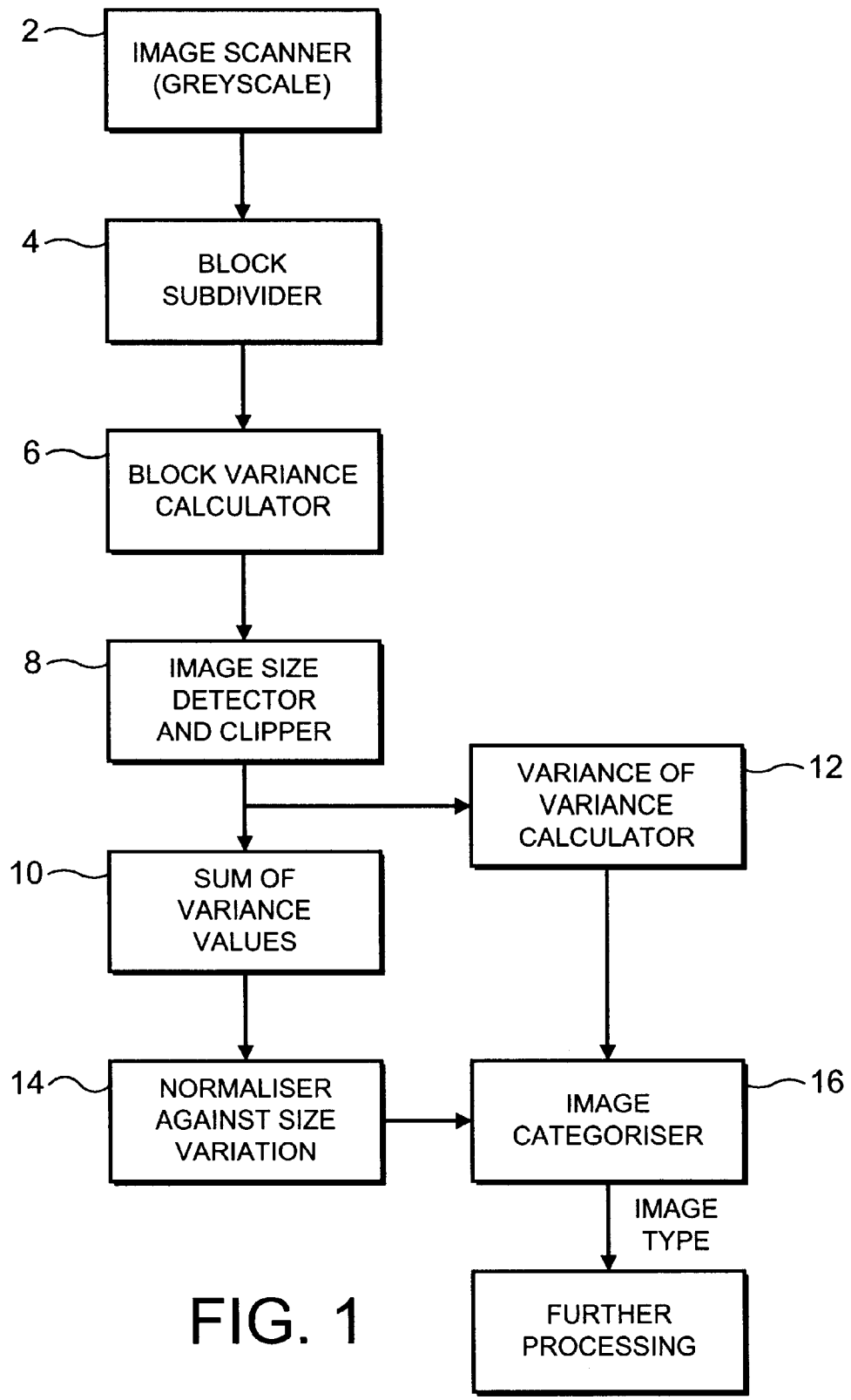
FIG. 1 shows a block diagram of apparatus embodying the invention.

The block diagram of FIG. 1 shows schematically the apparatus and processes which are required to categorise an image, as would be used in a mail processing system.

Initially, an image scanner 2 scans in an image of the document being processed and produces image values for each pixel of the image. These are usually grey scale but may be colour. In its simplest form grey scale could be a single bit with two values. However, we have found that this does not give particularly good results and a higher number of bits are required to achieve good categorisation of images.

Figure 2:
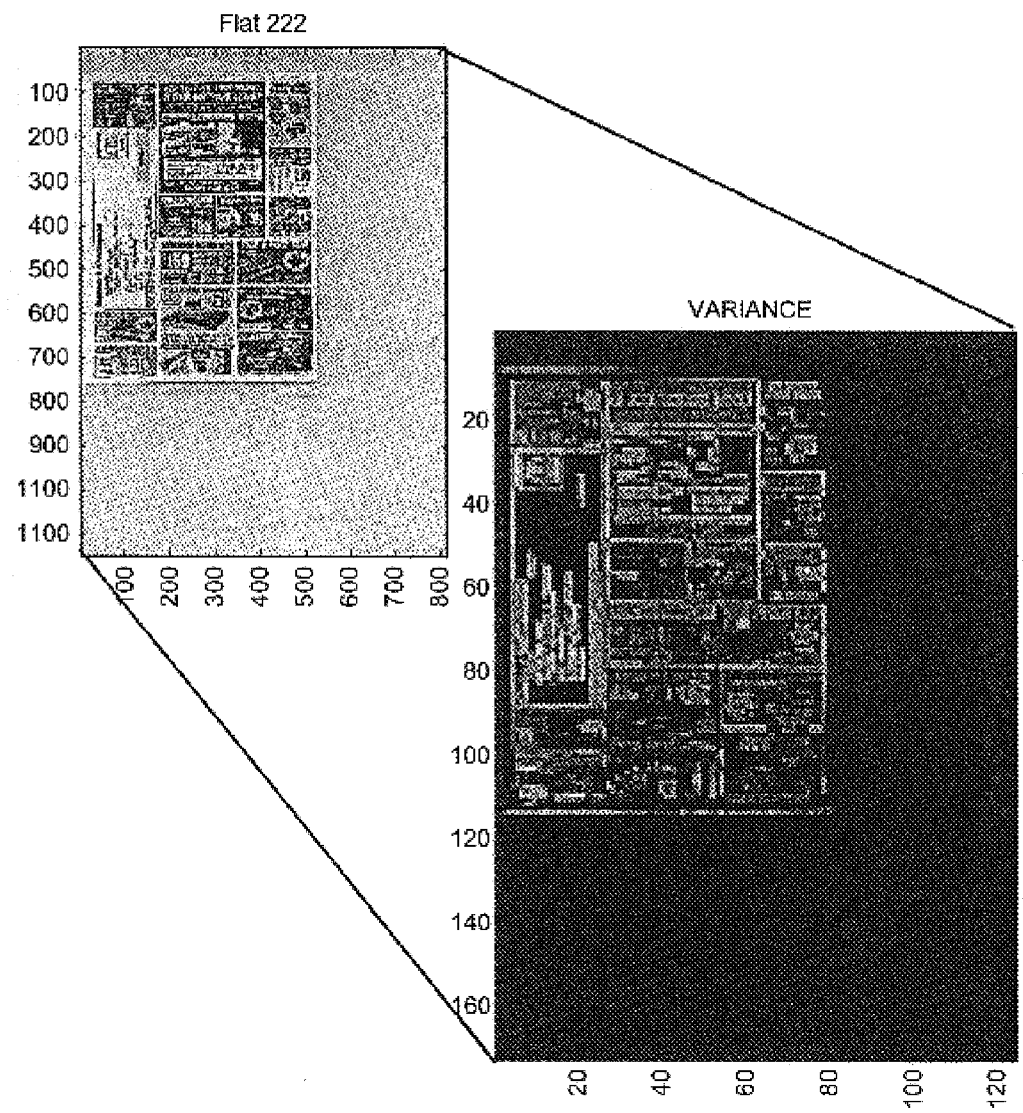
FIG. 2 shows an item of mail scanned when positioned on a uniform background.

FIG. 2 illustrates the scanning in of the image. As can be seen, the particular image in this example is a complex envelope with additional information printed on it. It occupies the top left-hand corner of the scanning area.

The grey scale scanned image is then divided in a block divider 4. Typically, blocks of 20×20 pixels have been found to be a suitable block size at 200 dots per inch (dpi) or $\frac{1}{10}$ of the scanned resolution but other sizes are possible. The image data for each block is then passed to a block variance calculator 6. This produces a variance figure for the grey scale data in each block. The variance data is cropped to the size of the document.

After this, the variance values for the relevant blocks are passed to a summation unit 10 which adds all the variances for the blocks together and are also passed to a unit 12 which calculates the variance of variances between the blocks.

A normaliser 14 divides the sum of the variances by the number of blocks to produce a normalised variance for the whole image. This and the output of the calculator for the variance of variances form an input to an image categoriser 16. This has an image type output which produces a signal dependent on the category of image determined from the normalised variance and the variance of variances. This signal can then be used in further processing to ensure that the correct type of further processing is used for the image.

Figure 3:
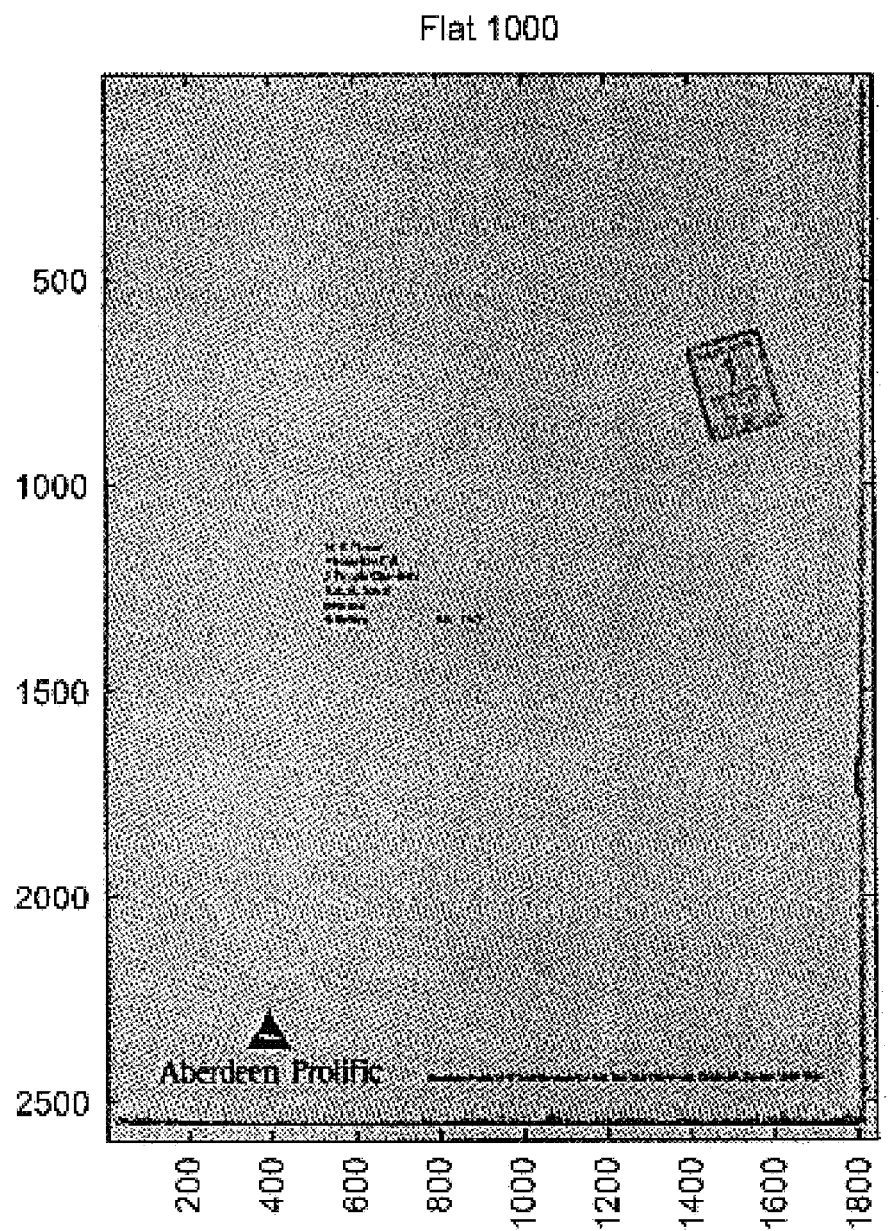
FIG. 3 shows an image of a white envelope.

FIG. 3 shows an image of a white envelope. When this is analysed by the circuitry of FIG. 1 the normalised variance of this comes to a low level, e.g., 162. The variance of variances, i.e., the range of variances included within the image will be relatively high so that there will be one or more blocks surrounding the address area and the printed material of the base of the image which have a high variance while the remainder of the image which is white will have a low variance. Thus, the inputs to the image categoriser will be a low normalised variance per block and a relatively high variance of variances. The image categoriser will interpret this as representing a white envelope with little printing on it and will allocate the appropriate image type signal to this image. This is used for setting up further processing to be performed on the image.

Figure 4:
FIG. 4 shows an image of a transparent envelope with printing on it.

FIG. 4 shows an image of a transparent envelope through which much of the internal material can be seen and which has the address label in the bottom left-hand corner. The normalised variance of this is detected as being 1552, thereby indicating that there is a lot of activity in the image and that the image is therefore probably quite complex. However, the variance of variance figure will be relatively low because there will be little variation in variance from block to block. Therefore, a high figure for normalised variants will be input to the image categoriser and a low figure for variance of variances. The image categoriser will in response to this set an image type to this image indicating that it is a complex image with much activity distributed relatively evenly over its surface and will therefore send an appropriate signal to the further processing circuitry to ensure that the correct type of processing is performed on it.

Figure 5:
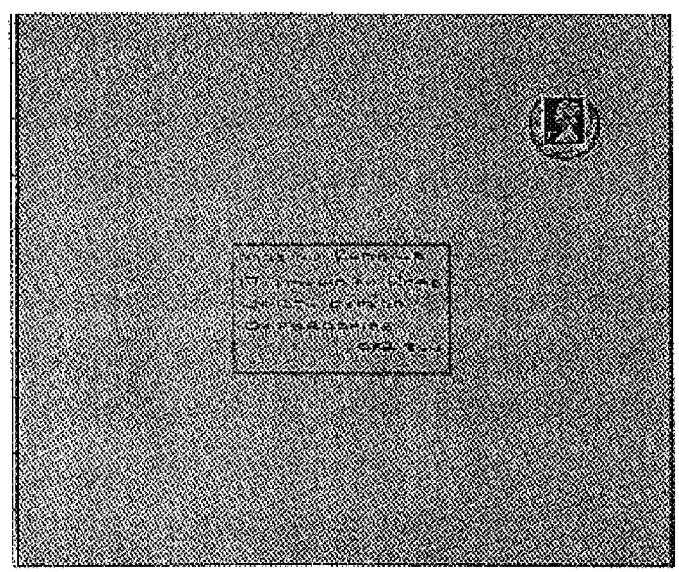
FIG. 5 shows an image of a buff envelope.

FIG. 5 shows a buff envelope. Buff envelopes tend not to be relatively but are textured in greyscale this translates to variations in grey level in a small scale.

The overall normalised variance of the envelope should be very low because the variations in grey level occur on a scale much smaller than the block size. However, the texture in the buff material adds to the normalised variance and so this will normally be higher than, for example, the white envelope of FIG. 4. However, because much of the activity comes from the envelope texture and colour, and this is fairly consistent across the image, the variance of the variance is relatively low for the image. Thus, the input to the image categoriser will be a low variance of variances figure and a normalized variance which is higher than would usually be expected for white envelopes. The image categoriser should then decide the image is of a buff type envelope and will produce an image type signal accordingly to ensure that it then receives the appropriate type of further processing.

The invention finds particular useful application in automated mail processing systems where it can be used to increase the computational efficiency of those systems by ensuring that the further processing applied to items of mail is tailored according to the type of image, thereby avoiding computation time which would be appropriate to complex images when processing e.g., plain envelopes.

The invention can be implemented in dedicated hardware or in software as will the apparent to those skilled in the art.

What is claimed is:

1. A method for processing an image, said method including the steps of:
   scanning an image to be processed to produce image data;
   storing the image data;
   determining a variance for the stored image data, said step of determining the variance for the stored image data being performed by:
   subdividing the image data into a plurality of blocks of pixels;
   determining a variance for each block of pixels;
   summing the pixel block variances; and
   normalizing the result of said summation step to produce a variance for the stored image data; and
   based on the determined variance for the stored image data, determining appropriate further processing of the scanned image.

2. The method for processing an image of claim 1, wherein:
   a variance for the pixel block variances is determined; and
   in said step of determining appropriate further processing of the scanned image, said determination is further based on the determined variance for the pixel block variances.

3. The method of processing an image of claim 2, wherein said step of determining the variance of the stored image data includes: a step of determining which portion of the stored image data includes relevant data; and determining the variance of the stored image data only for the portion of the stored image data that includes the relevant data.

4. The method of processing an image of claim 2, wherein:
   in said step of scanning an image, a piece of mail is scanned; and
   in said step of determining the appropriate further processing of the scanned image, based on the determined variance of the stored image data and the determined variance for the pixel block variances, the type of mail forming the scanned image is determined and the appropriate further processing of the scanned image is based on the determined type of mail.

5. The method for processing an image of claim 1, wherein the image data produced in said scanning step is grey scale data.

6. The method for processing an image of claim 1 wherein, in said step of subdividing the stored image data, the image data are divided into 20 pixel by 20 pixel blocks.

7. The method of processing an image of claim 1, wherein said step of determining the variance of the stored image data includes: a step of determining which portion of the stored image data includes relevant data; and determining the variance of the stored image data only for the portion of the stored image data that includes the relevant data.

8. The method of processing an image of claim 1, wherein:
   in said step of scanning an image, a piece of mail is scanned; and
   in said step of determining the appropriate further processing of the scanned image, based on the determined variance of the stored image data, the type of mail forming the scanned image is determined and the appropriate further processing of the scanned image is based on the determined type of mail.

9. The method of processing an image of claim 8, wherein, in said step of determining the appropriate further processing of the scanned image, the type of mail forming the scanned image is determined to be one from the group consisting of: a white envelop; a transparent envelop; and a buff envelop.

10. An apparatus for processing an image, said apparatus comprising:
    means for scanning an image to produce image data;
    means for storing the image data that is connected to said means for scanning an image to receive and store the image data;
    means for determining a variance for the scanned image that is connected to said means for storing the image data to receive the stored image data, said means for determining a variance for the scanned image including:
    means for subdividing the image data into a plurality of blocks of pixels;
    means for determining a variance for each block of pixels;
    means for summing the pixel block variances; and
    means for normalizing the sum of the pixel block variances to produce the variance for the scanned image; and
    means for determining appropriate further processing of the scanned image based on the determined variance for the scanned image.

11. The apparatus for processing an image of claim 10, further including:
    means for determining a variance for the pixel block variances; and
    wherein, said means for determining appropriate further processing of the scanned image further determines the appropriate image processing based on the variance for the pixel block variances.

12. The apparatus for processing an image of claim 11, wherein: said means for determining the variance of the scanned image further includes means for determine which portion of the image data includes relevant data; and said means for determining the variance of the scanned image determines the variance of the scanned image based only on the portion of the image data that includes relevant data.

13. The apparatus for processing an image of claim 11, wherein:

said means for scanning is configured to scan a piece of mail so that the scanned image is an image of the mail; and said means for determining the appropriate further processing of the scanned image is configured to, based on the determined image variance and the determined variance for the pixel block variances, determines the type of mail scanned, and based on the type of mail scanned, determines the appropriate further processing of the scanned image.

14. The apparatus for processing an image of claim 10, wherein said means for scanning an image produces the image data as grey scale data.

15. The apparatus for processing an image of claim 10, wherein said means for subdividing the image data subdivides the image data into 20 pixel by 20 pixel blocks.

16. The apparatus for processing an image of claim 10, wherein: said means for determining the variance of the scanned image further includes means for determine which portion of the image data includes relevant data; and said means for determining the variance of the image determines the variance of the scanned image based only on the portion of the image data that includes relevant data.

17. The apparatus for processing an image of claim 10, wherein:

said means for scanning is configured to scan a piece of mail so that the scanned image is an image of the mail; and said means for determining the appropriate further processing of the scanned image is configured to, based on the determined scanned image variance, determine the type of mail scanned and, based on the determined type of mail scanned, determine the appropriate further processing of the scanned image.

18. The apparatus for processing an image of claim 17, wherein said means for determining the appropriate further processing of the scanned image is configured to determine the type of mail scanned is one from the group consisting of: a white envelop; a transparent envelop; a buff envelop.

* * * * *